US010696513B2

(12) United States Patent
Johnson

(10) Patent No.: US 10,696,513 B2
(45) Date of Patent: Jun. 30, 2020

(54) MODULAR FESTOON SYSTEM

(71) Applicant: BARTELL MACHINERY SYSTEMS L.L.C., Rome, NY (US)

(72) Inventor: Christopher L. Johnson, Blossvale, NY (US)

(73) Assignee: BARTELL MACHINERY SYSTEMS, L.L.C., Rome, NY (US)

( * ) Notice: Subject to any disclaimer, the term of this patent is extended or adjusted under 35 U.S.C. 154(b) by 0 days.

(21) Appl. No.: 15/953,697

(22) Filed: Apr. 16, 2018

(65) Prior Publication Data
US 2018/0305171 A1    Oct. 25, 2018

Related U.S. Application Data

(60) Provisional application No. 62/488,925, filed on Apr. 24, 2017.

(51) Int. Cl.
*B65H 63/02* (2006.01)
*B65H 59/10* (2006.01)
(Continued)

(52) U.S. Cl.
CPC .............. *B65H 63/02* (2013.01); *B65H 51/20* (2013.01); *B65H 59/10* (2013.01); *B65H 59/36* (2013.01);
(Continued)

(58) Field of Classification Search
CPC ........ B65H 51/08; B65H 51/20; B65H 59/10; B65H 59/36; B65H 20/34; B65H 57/14; B65H 63/04
See application file for complete search history.

(56) References Cited

U.S. PATENT DOCUMENTS 2,185,245 A    1/1940 Cotchett
2,226,135 A    12/1940 Newton, Jr. et al.
(Continued)

FOREIGN PATENT DOCUMENTS

DE    1574302    5/1971
EP    0217663    4/1987
(Continued)

OTHER PUBLICATIONS

International Search Report and Written Opinion for PCT/US2018/027764 dated Aug. 1, 2018, 18 pgs.
(Continued)

*Primary Examiner* — Michael C McCullough
(74) *Attorney, Agent, or Firm* — Brinks Gilson & Lione

(57) ABSTRACT

In one example, a festoon system comprises a festoon module having a support assembly, and further comprises at least one upper sheave and at least one lower sheave, which are movable relative to one another by movement of at least one of the upper sheave or the lower sheave. At least one wire is configured to enter the festoon module at an entrance region, extend around a groove of the least one lower sheave and at least one groove of the at least one upper sheave, and then exit the festoon module at an exit region. A first coupling location of the support assembly is adjacent to the entrance region of the festoon module, and a second coupling location of the support assembly is adjacent to the exit region of the festoon module. Different modules are configured to be coupled to the second coupling location.

14 Claims, 13 Drawing Sheets

(51) Int. Cl.
*B65H 63/04* (2006.01)
*B65H 51/20* (2006.01)
*B65H 59/36* (2006.01)
*B29D 30/00* (2006.01)
*B29D 30/48* (2006.01)

(52) U.S. Cl.
CPC ......... *B65H 63/04* (2013.01); *B29D 30/0016* (2013.01); *B29D 2030/0044* (2013.01); *B29D 2030/487* (2013.01); *B65H 2404/152* (2013.01); *B65H 2404/167* (2013.01); *B65H 2407/30* (2013.01); *B65H 2555/11* (2013.01); *B65H 2701/36* (2013.01); *B65H 2801/93* (2013.01)

(56) References Cited

U.S. PATENT DOCUMENTS

| | | | |
|---|---|---|---|
| 2,237,371 A | 4/1941 | Simons | |
| 2,263,278 A | 11/1941 | Senna | |
| 2,560,204 A * | 7/1951 | Andren | B21C 49/00 242/154 |
| 3,049,308 A | 8/1962 | Lang | |
| 3,051,362 A * | 8/1962 | Shook | B29D 30/48 226/11 |
| 3,286,499 A | 11/1966 | Junta et al. | |
| 3,567,148 A | 3/1971 | Ottavan | |
| RE27,547 E * | 1/1973 | Lang | B29D 30/48 156/136 |
| 3,794,229 A | 2/1974 | Hunter | |
| 3,912,191 A | 10/1975 | Anderson et al. | |
| 4,186,861 A * | 2/1980 | Steinhilber | B65H 51/20 226/118.2 |
| 4,915,282 A * | 4/1990 | Martin | B65H 20/34 226/1 |
| 4,949,567 A | 8/1990 | Corbin | |
| 5,228,942 A | 7/1993 | Kokui et al. | |
| 5,865,393 A * | 2/1999 | Kreft | B21C 49/00 226/118.2 |
| 5,941,473 A * | 8/1999 | Kawano | B65H 23/198 242/413.1 |
| 6,345,753 B1 * | 2/2002 | de Kock | B21C 49/00 226/118.2 |
| 9,790,050 B2 * | 10/2017 | Johnson | B65H 57/14 |
| 9,919,894 B2 * | 3/2018 | Nishida | B65H 51/20 |
| 2003/0167748 A1 | 9/2003 | Wortmann | |
| 2005/0145320 A1 | 7/2005 | Niwa | |
| 2011/0027057 A1 | 2/2011 | Etienne | |

FOREIGN PATENT DOCUMENTS

| | | |
|---|---|---|
| EP | 2772349 | 9/2014 |
| JP | 2000158558 | 6/2000 |
| WO | WO 97/48548 | 12/1997 |
| WO | WO 01/60540 | 8/2001 |
| WO | 2010/012016 | 2/2010 |

OTHER PUBLICATIONS

International Preliminary Report on Patentability for PCT/US2018/027764 dated Nov. 7, 2019, 11 pgs.
Communication pursuant to Rules 161(1) and 162 EPC for EP18721931.6 dated Dec. 3, 2019, 3 pgs.

* cited by examiner

MODULAR FESTOON SYSTEM

PRIORITY CLAIM

This invention claims the benefit of priority of U.S. Provisional Application Ser. No. 62/488,925, entitled "Modular Festoon System," filed Apr. 24, 2017, the disclosure of which is hereby incorporated by reference in its entirety.

BACKGROUND

The present embodiments relate generally to a festoon system, such as one used during a process to form tire beads.

Many types of vehicular tires include beads surrounding the openings that engage the wheel rim. In general, beads comprise a wire coil in the nature of a hoop formed by winding multiple turns of a coated wire on a suitable bead forming apparatus. The bead may be made up of multiple, radially and axially arranged turns of a single wire or, in so-called weftless beads, of radially stacked layers of a flat ribbon including a plurality of side-by-side wires.

In any case, the single or multiple wires are pulled from one or more supply reels and passed through an extrusion die apparatus that applies a coating of rubber or rubberized material to the wire(s). The coated wire or ribbon is supplied to a conventional bead forming apparatus wherein one or more beads are wound to the desired dimensions and cross-sectional configuration.

In some systems, multiple sheaves or pulleys are provided between the coating operation and the bead forming apparatus to guide the wire and maintain tension upon the wire as conditions change. In general, the sheaves or pulleys are mounted upon respective axles for independent rotation. The multiple sheaves are mounted upon suitable support means, usually in vertically disposed relation, for relative movement toward and away from one another as the bead material is dispensed faster and slower, respectively, than it is accumulated. In some systems, an upper set of sheaves is fixedly supported at a position several meters above floor level and a lower set is vertically movable with respect thereto in order to ensure that proper tension is maintained during such movement. However, in other systems, the lower set of sheaves may be fixedly supported and the upper set of sheaves may be vertically movable.

Conventional systems may be relatively large, and placement within a facility may be challenging and dependent on space constraints, placement of other upstream or downstream equipment within a facility, and other factors.

SUMMARY

In one example, a festoon system comprises a festoon module having a support assembly, and further comprises at least one upper sheave and at least one lower sheave, which are movable relative to one another by movement of at least one of the upper sheave or the lower sheave. At least one wire is configured to enter the festoon module at an entrance region, extend around a groove of the least one lower sheave and at least one groove of the at least one upper sheave, and then exit the festoon module at an exit region. A first coupling location of the support assembly is adjacent to the entrance region of the festoon module, and a second coupling location of the support assembly is adjacent to the exit region of the festoon module. Different modules are configured to be coupled to the second coupling location.

In another embodiment, a festoon system comprises a first operative state, where at least one wire is configured to enter the festoon module at an entrance region, extend around a groove of the least one lower sheave and at least one groove of the at least one upper sheave, and then exit the festoon module at an exit region. In a second operative state, at least one wire is configured to enter the festoon module at the exit region, extend around a groove of the least one lower sheave and at least one groove of the at least one upper sheave, and then exit the festoon module at the entrance region.

In another embodiment, a festoon system comprises an error detection module configured to be coupled to the first coupling location. The error detection module may comprise an inlet sheave that is axially movable when high tension is placed on the at least one wire.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
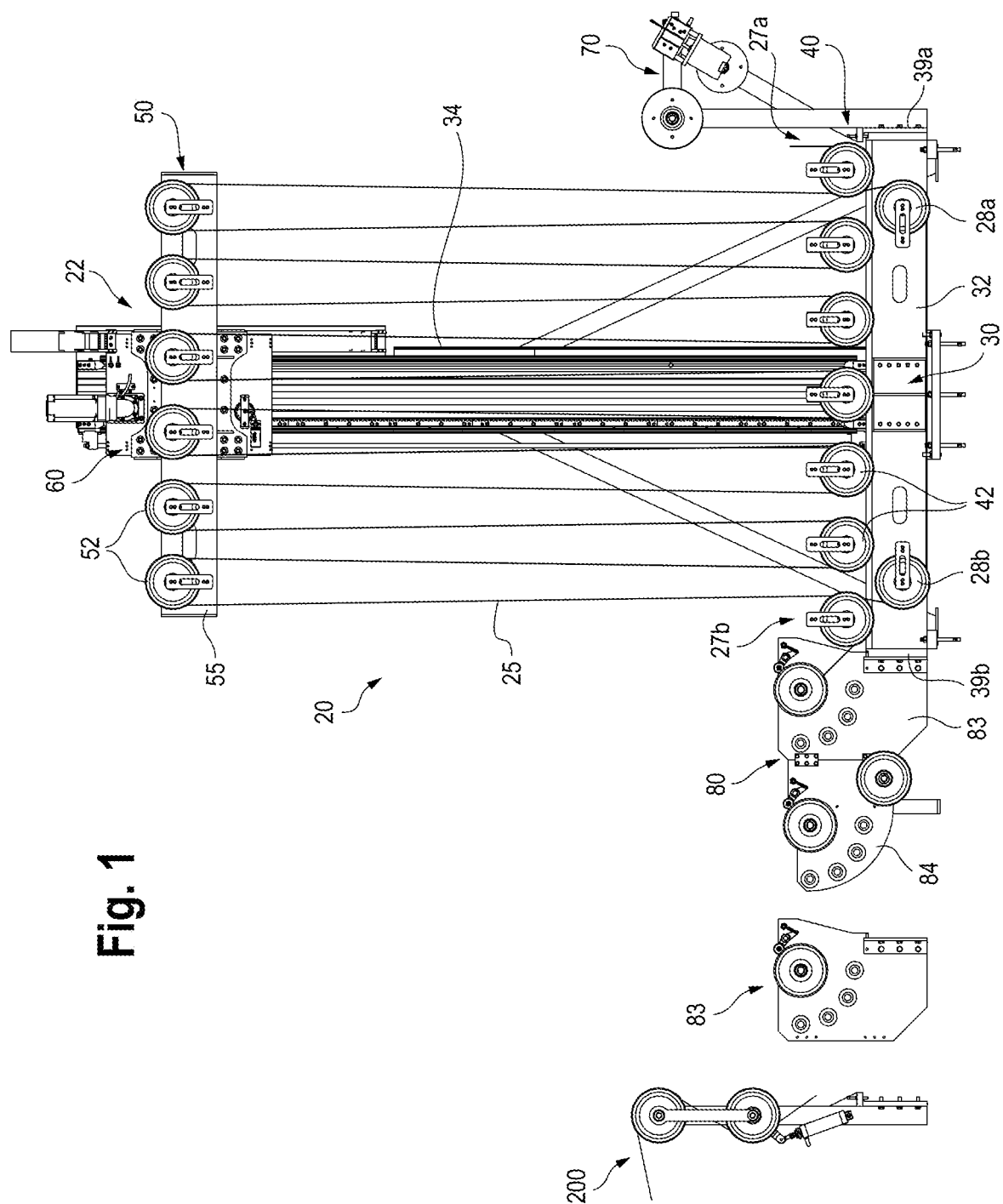
FIGS. 1-2 are front and perspective views, respectively, of a first embodiment of a festoon system.
Figure 2:
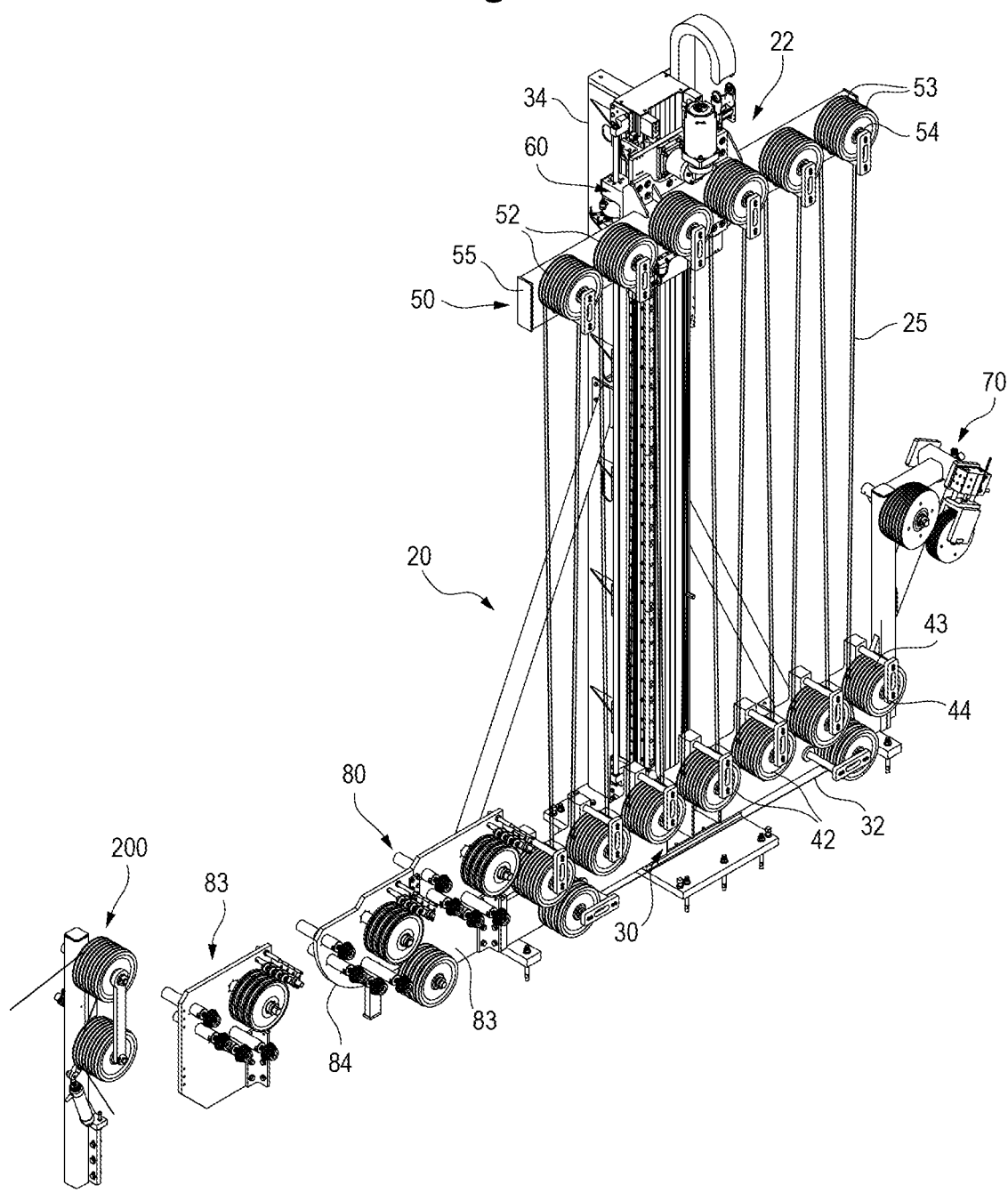

Referring to FIGS. 1-2, front and perspective views of a first embodiment of a modular festoon system 20 are shown. The system 20 may comprise a festoon module 22 having a support assembly 30, which comprises a generally horizontal support member 32 and a generally vertical support member 34. In this embodiment, the horizontal support member 32 is adapted to be positioned adjacent to a floor, while the vertical support member 34 is secured near a central region of the horizontal support member 32 and extends in an upward direction.

The festoon module 22 comprises a lower series of sheaves 40 and an upper series of sheaves 50. In this non-limiting example, the lower series of sheaves 40 comprises seven sheaves 42, each of which are secured in a fixed relationship relative to the horizontal support member 32, as shown and explained in further detail with respect to FIG. 7 below.

The upper series of sheaves 50, in the examples shown, comprises six sheaves 52, each of which are secured to a support beam 55 that is movable with respect to the vertical support member 34 by an actuation system 60, as explained further below. When the festoon system 20 is used for assisting with adjusting tension or storing a length of one or more wires 25, which may be disposed between an upstream wire coating system and a downstream bead forming station, the upper series of sheaves 50 is capable of relative movement toward and away from the lower series of sheaves 40. Such movement of the upper sheaves 50 towards and away from the lower sheaves 40 may be beneficial when the bead material is dispensed faster and slower, respectively, than it is accumulated. In other words, depending on the needs of the operation occurring upstream or downstream of the system 20, the upper series of sheaves 50 moves vertically in either direction in order to ensure that proper tension is maintained on the one or more wires 25.

However, in alternative embodiments, it will be appreciated that the lower series of sheaves 40 may be vertically movable, and the upper series of sheaves 50 may be fixed, while still achieving the advantages of the system as explained in further detail below. Moreover, while seven lower sheaves 42 and six upper sheaves 52 are depicted in the present embodiments, it will be appreciated that a greater or lesser number of lower and upper sheaves may be provided.

Figure 7:
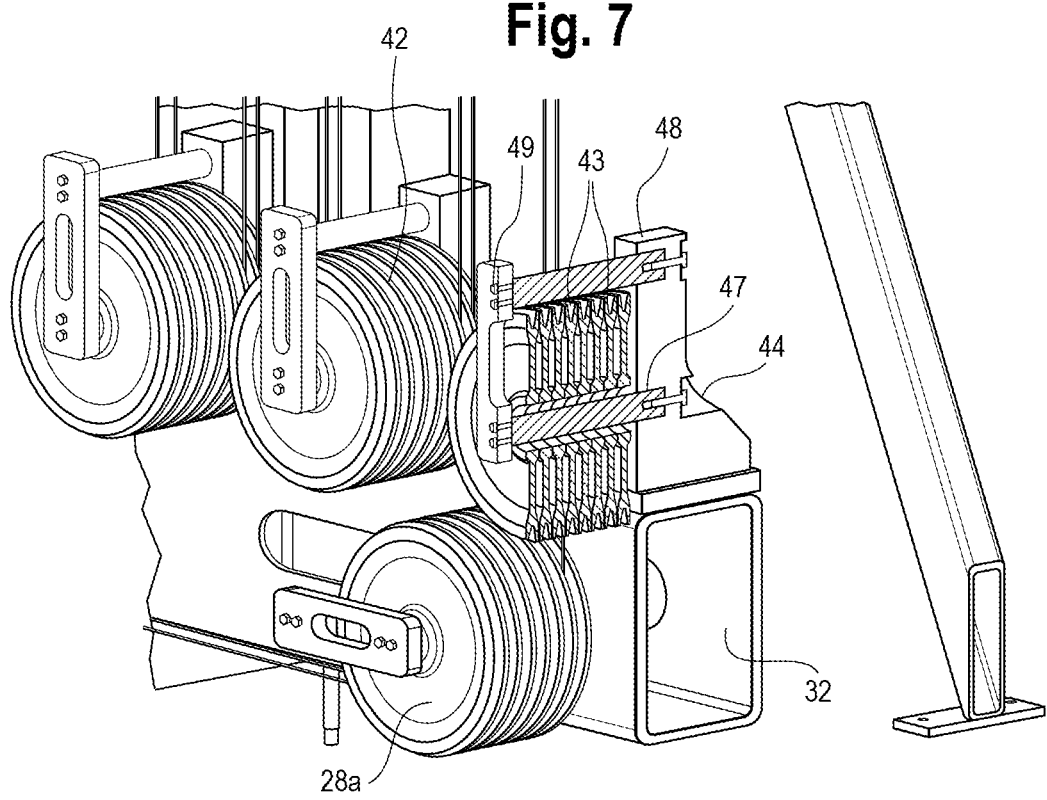
FIG. 7 is a frontal perspective view illustrating features of a sheave of the festoon system.

Each of the lower sheaves 42 may comprise one or more grooves 43 for guiding the one or more wires 25, and further are rotatable about a central axis 44, as depicted in FIGS. 2 and 7. Similarly, each of the upper sheaves 52 may comprise one or more grooves 53 for guiding the one or more wires 25, and further are rotatable about a central axis 54. In the present embodiments, eight grooves 43 are depicted for each of the lower sheaves 42, as best seen in FIG. 7, while eight grooves 53 are depicted for each of the upper sheaves 52. In this manner, the festoon system 20 may handle up to eight wires 25 simultaneously, where each wire is guided in a corresponding groove of the sheaves 42 and 52. Such a system may be particularly useful when a downstream bead forming machine is capable of manufacturing up to eight tire beads simultaneously.

In alternative embodiments, the sheaves 42 and 52 may comprise greater or fewer than eight grooves. Moreover, there does not have to be a direct one-to-one correspondence for the number of wires 25 and the number of grooves. For example, if the downstream bead forming machine is only capable of manufacturing four tire beads simultaneously, then only four of the grooves may accommodate wires 25, while the other four grooves may be empty, for any given sheave 42 and 52. Moreover, in some embodiments, certain individual sheaves 42 and 52 may be removable, thereby providing less than the seven lower sheaves 42 and six upper sheaves 52, in which case the pathway of the one or more wires 25 may be altered.

The festoon system 20 may further comprise select modular components disposed upstream or downstream relative to the festoon module 22 having the lower and upper sheaves 42 and 52. For example, a user may select certain modules among an error detection module 70, a precast assembly 80, and a dancer assembly 200 for use with the festoon system 20, each of which are described in greater detail below.

In one embodiment, a particular wire 25 may be guided towards an entrance region 27a of the festoon module 22, which may be downstream of the error detection module 70, as shown in FIG. 1. The wire 25 then may be guided around the lower sheave 42 closest to the entrance region 27a, then guided in a serpentine pattern around each of the other upper and lower sheaves 42 and 52, as depicted in FIG. 1, towards an exit region 27b of the festoon module 22. In one embodiment, the wire 25 may travel downstream after exiting the sheave closest to the exit region 27b, e.g., for further handling by the precast assembly 80 or the dancer assembly 200.

In an alternative embodiment, one of the wires 25 may be "double-strung" around the sheaves 42 and 52. In this embodiment, the particular wire 25 may follow the same path around the sheaves 42 and 52 as noted above, but instead of exiting towards the downstream equipment immediately, the wire 25 may be directed around a sheave 28b near the exit region 27b and subsequently in a direction around a sheave 28a near the entrance region 27a. The path of the wire 25 may be adjusted radially outward between the sheaves 28a and 28b, such that the wire 25 may enter a different groove of the sheave 42 closest to the entrance region 27a, and then proceed in the same serpentine pattern around the sheaves 42 and 52, albeit in a different path. In this manner, if the sheaves 42 and 52 comprise eight grooves, they may accommodate four "double-strung" wires 25. Such technique may be advantageous for providing extra storage of a particular wire 25 within the system 20, particularly during high speed operations.

Figure 3:
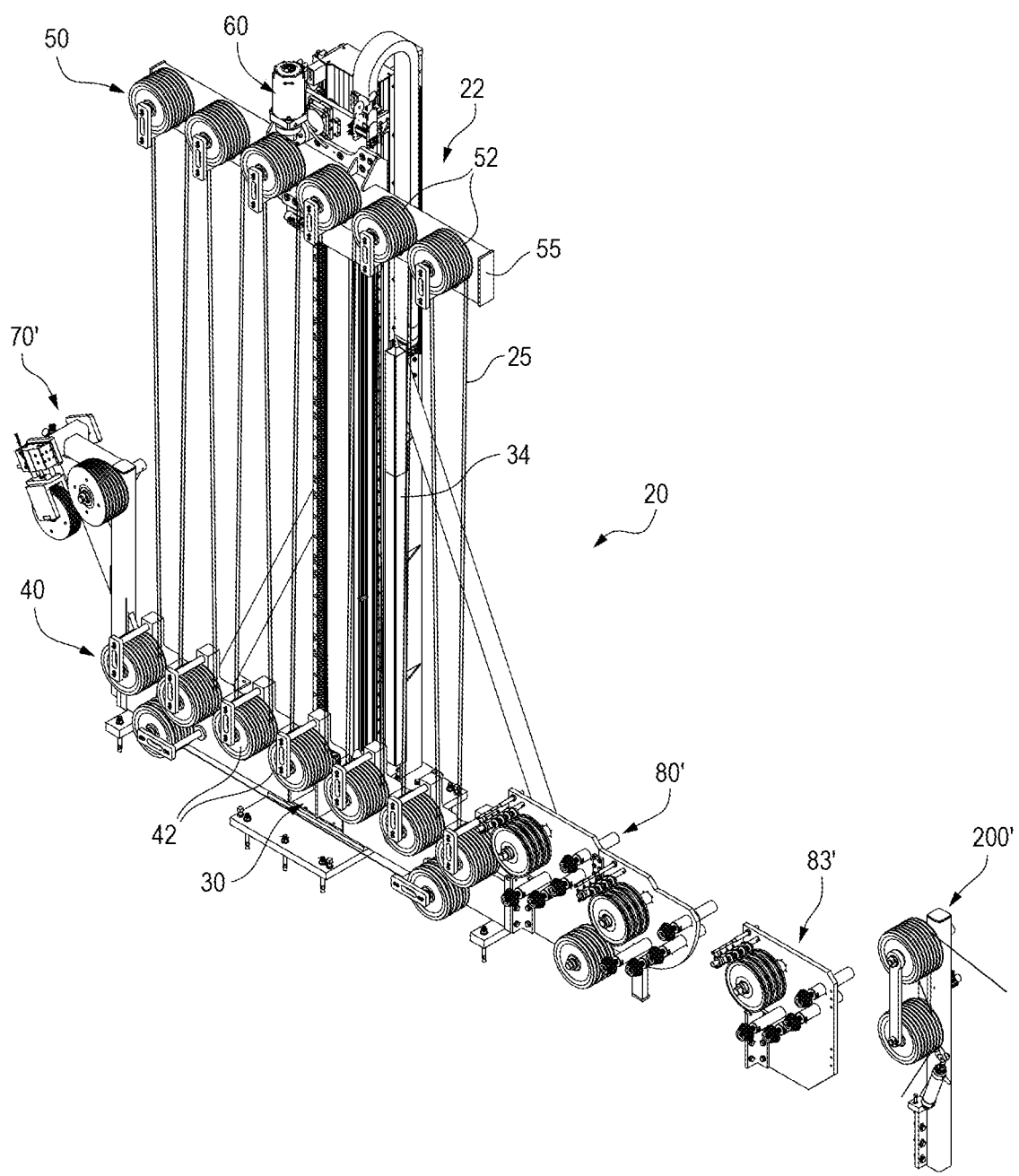
FIG. 3 is a perspective view of an alternative embodiment of a festoon system.

The precast assembly 80 comprises a first module 83 and an optional extension module 84, explained further below. In FIGS. 1-3, the extension module 84 is shown in an operative state secured to the first module 83. Other first modules 83 and 83' are shown separately in FIGS. 1-3 to represent that, in the alternative of FIG. 13 below, only the first module 83 may be coupled to the system 20. Additionally, the dancer assemblies 200 and 200' are shown separately in FIGS. 1-3 to represent that, in the alternative of FIG. 17 below, the dancer assembly 200 may be coupled to the system 20 in lieu of the precast assembly 80.

Advantageously, as explained further below, the modularity of the festoon system 20 allows the for the system to be provided as a "left-handed" or "right-handed" machine, depending on space constraints, placement of other upstream or downstream components within a facility, or other needs of a particular user. For example, in FIGS. 1-2, it may be noted that the error detection module 70 is disposed upstream and to the right side (from the front view) relative to the lower and upper sheaves 42 and 52 of the festoon module 22, and the precast assembly 80 is disposed downstream and to the left side. However, in FIG. 3, an alternative error detection module 70' (having symmetrical or "mirror-image" features as the error detection module 70) has been moved to the left side relative to the lower and upper sheaves 42 and 52, while an alternative precast assembly 80' (having symmetrical features as the precast assembly 80) has been moved to the right side relative to the lower and upper sheaves 42 and 52. Advantageously, a customer may therefore have the upstream end, beginning at the error detection module 70 or 70', be placed to either to the left or right side of the festoon module 22, providing significant logistic advantages.

In one exemplary method, as part of a tire bead forming system, the one or more wires 25 may arrive at the error detection module 70 or 70' (depending on whether a left or right hand system is used) from an initial location at which an extruder has applied a desired coating to the wire 25, as is generally known. The wire 25 then may be guided through the error detection module 70 or 70', as explained further below, and then around the lower and upper sheaves 42 and 52 in either a single or double-strung manner, as explained above. The wire 25 then may be guided through the precast assembly 80 or 80', or a dancer assembly 200 or 200' (depending on which module is desirable, and whether a left or right hand system is used). The wire 25 then may be advanced downstream to a winding assembly, wherein the wire is wound to a bead having desired dimensions.

Figure 4:
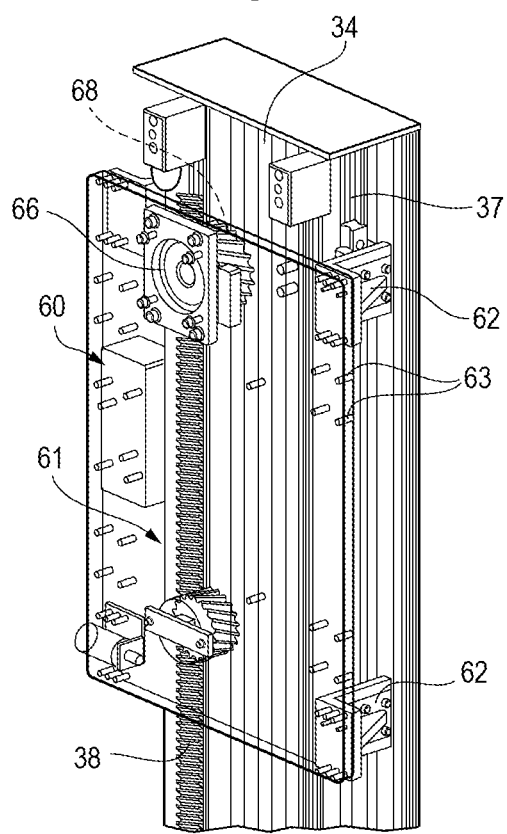
FIGS. 4-5 are frontal perspective views depicting features of an exemplary actuation system.
Figure 5:
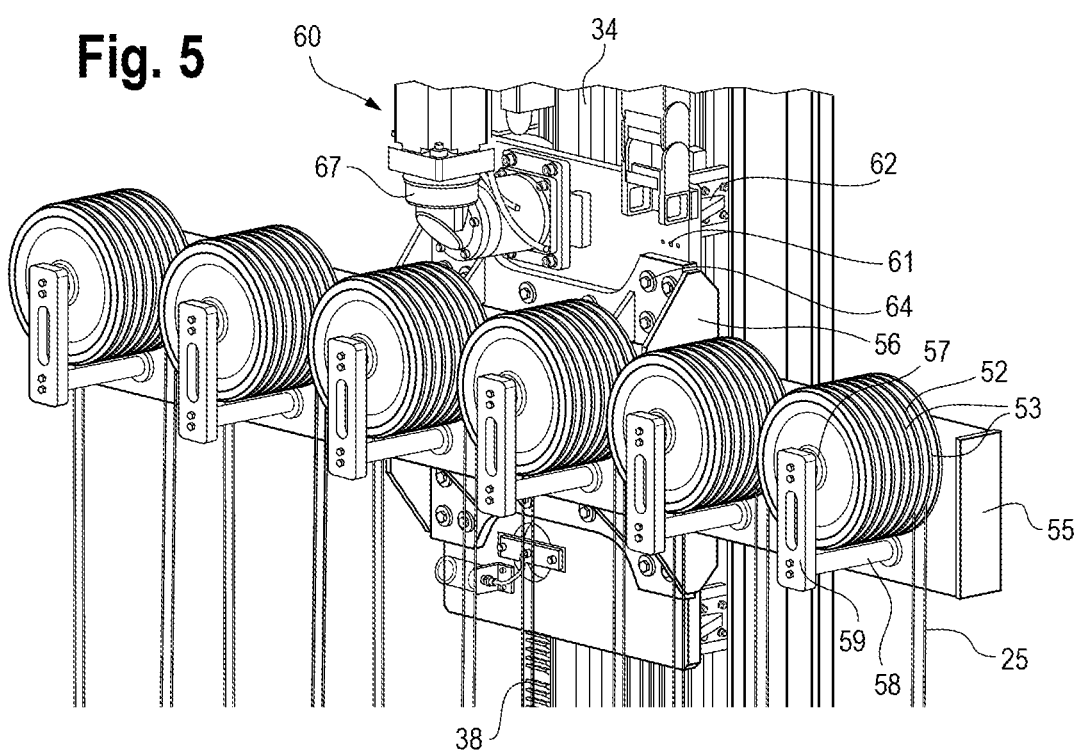

Referring to FIGS. 4-5, details of an exemplary actuation system 60 are shown. The actuation system 60 is capable of causing vertical movement of the upper series of sheaves 50 relative to the vertical support member 34. The actuation system 60 may comprise a base 61 coupled to one or more guides 62, which are configured for vertical movement within corresponding slots 37 of the vertical support member 34, as shown in FIG. 4. The base 61 may comprise one or more apertures 63 for receiving bolts 64, which couple peripheral segments 56 of the support beam 55 to the base 61. Accordingly, the support beam 55 and the upper sheaves 52 will move vertically as the base 61 moves vertically.

The base 61 further comprises an actuation coupling region 66, shown in FIG. 4, to which an actuator 67 may be coupled, as shown in FIG. 5. In one embodiment, the actuator 67 comprises a motor that is configured to rotate a pinion 68, which is coupled on a side of the base 61 closer to the vertical support member 34, as shown in FIG. 4. The pinion 68 may rotate with respect to a rack 38 on the vertical support member 34, thereby allowing the base 61 to move vertically with respect to the rack 38 and the vertical support member 34.

Referring still to FIG. 5, each of the sheaves 52 is coupled to the support beam 55 around a central support shaft 57, in conjunction with a peripheral shaft 58 and a connecting board 59. The connecting board 59 has a first region coupled to an end of the central support shaft 57 disposed away from the support beam 55, and has a second region coupled to an end of the peripheral shaft 58 also disposed away from the support beam 55, as shown in FIG. 5.

Figure 6:
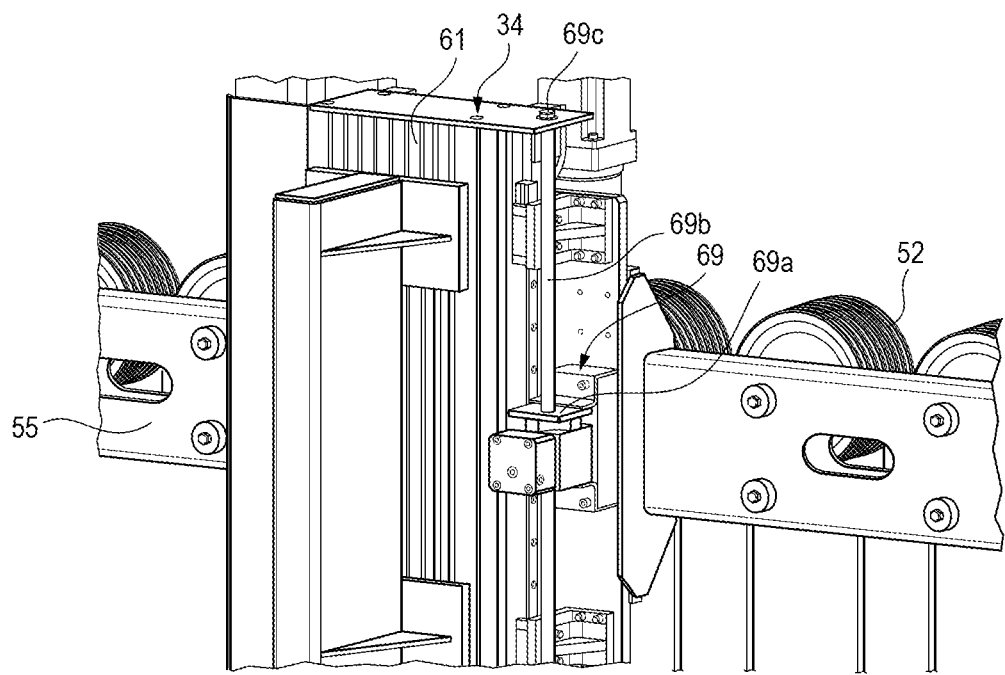
FIG. 6 is a rear perspective view of an exemplary braking system.

Referring to FIG. 6, an integrated brake 69 may be provided to selectively inhibit vertical movement of the base 61, and in turn the support beam 55 and the upper sheaves 52. In the example of FIG. 6, the integrated brake 69 comprises a clamping segment 69a that is fixed to a rear side of the base 61. The clamping segment 69a comprises a central bore disposed around a guide rod 69b, which is fixed relative to the vertical support member 34, e.g., via a bolt 69c, as shown in FIG. 6. In normal use, the clamping segment 69a is permitted to move vertically relative to the guide rod 69b, together with vertical movement of the base 61, and in turn the support beam 55 and the upper sheaves 52. If braking is required, e.g., due to a sensor which depicts an error in operation, then a signal may be provided to actuate the clamping segment 69a to engage the guide rod 69b, thereby inhibiting vertical movement of the base 61, and in turn the support beam 55 and the upper sheaves 52.

Referring to FIG. 7, each of the sheaves 42 is coupled to the horizontal support member 32 around a central support shaft 47, in conjunction with a peripheral shaft 48 and a connecting board 49. The connecting board 49 has a first region coupled to an end of the central support shaft 47 disposed away from the horizontal support member 32, and has a second region coupled to an end of the peripheral shaft 48 also disposed away from the horizontal support member 32, as shown in FIG. 7.

Figure 8A:
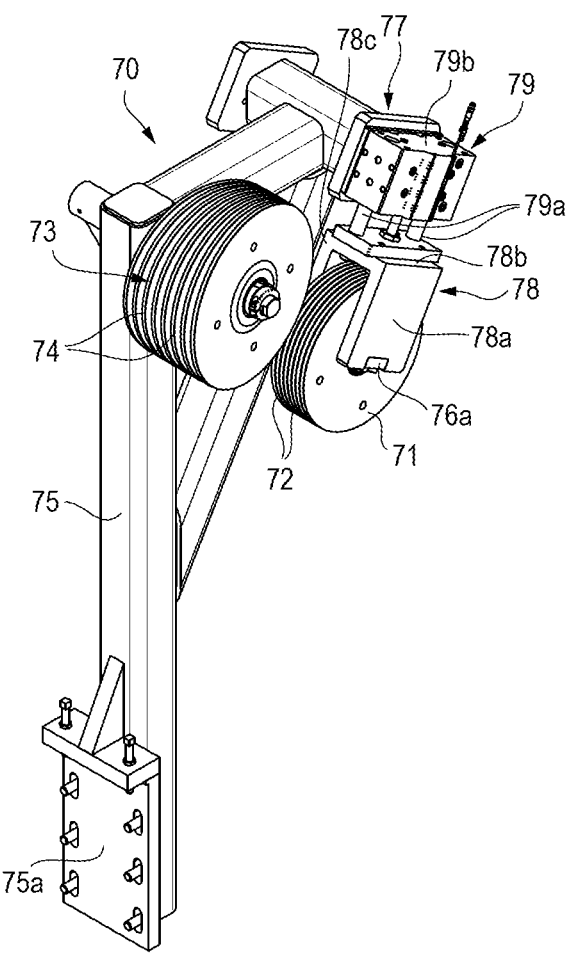
FIGS. 8A-8B are perspective and top views, respectively, of an error detection module.
Figure 8B:
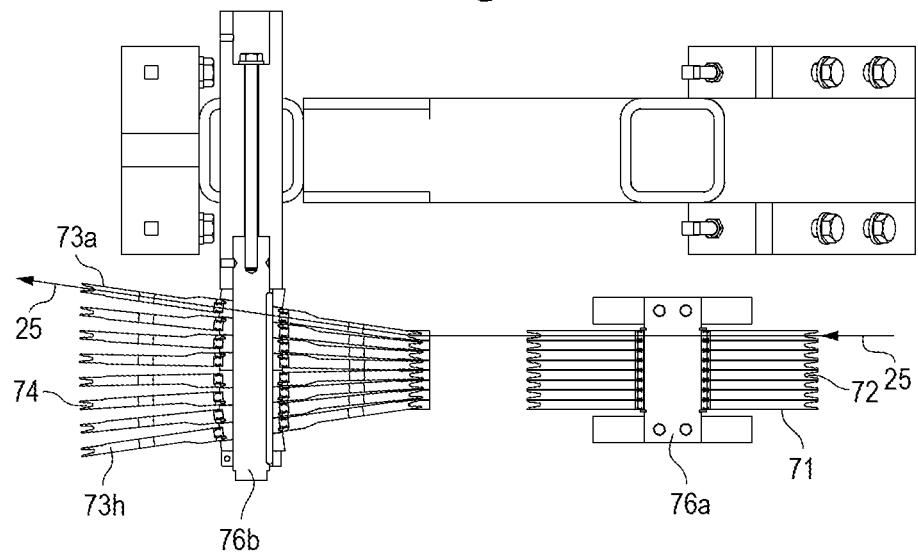

Referring to FIGS. 8-9, features of the error detection module 70 are shown. In one embodiment, the error detection module 70 comprises an inlet sheave 71 having one or more grooves 72, and further comprises an outlet sheave 73 comprising a series of sheaves, e.g., eight sheaves 73a-73h may be provided in a system that can accommodate up to eight wires. Each of the outlet sheaves 73a-73h has a groove 74. In this example, the outlet sheaves 73a-73h are angled with respect to one another, as best seen in FIG. 8B, thereby providing a capability to adjust the path of a wire 25 further outward or in a different direction relative to the entrance point at the inlet sheave 71. The outlet sheaves 73a-73h may be disposed on a common shaft 76b, with spacers being keyed to the shaft 76b and adapted to provide directional orientation for the outlet sheaves 73a-73h. In this manner, each of the outlet sheaves 73a-73h may rotate about their own individual axes, which all may be different, as depicted in FIG. 8B.

The common shaft 76b of the outlet sheaves 73a-73h may be operatively coupled to a base support 75, as seen in FIGS. 8-9. A coupling region 75a of the base support 75 in turn may be modularly coupled to the horizontal support member 32 at location 39a, as shown in FIG. 1.

As shown in FIGS. 8-9, the error detection module 70 comprises a detection device 77, which in this embodiment comprises a bracket 78 and a pneumatic cylinder 79. As best seen in FIG. 8A, the bracket 78 may comprises a C-shaped bracket with three sides 78a-78c, where sides 78a and 78c are coupled to a lateral shaft 76a of the inlet sheave 71, and the intermediate side 78b is generally perpendicular to the sides 78a and 78c and disposed at a location adjacent to the pneumatic cylinder 79. Guide rods 79a of the pneumatic cylinder 79 may be coupled to the intermediate side 78b of the bracket 78, as shown in FIG. 8A, and an opposing side of the pneumatic cylinder 79 may be secured to a fixed body 79b. It will be appreciated that while a bracket 78 and pneumatic cylinder 79 are depicted as exemplary components of the detection device 77, other mechanical or electrical linkages or actuators may be coupled between the inlet sheave 71 and the fixed body 79b, while still achieving the advantages noted below.

Figure 9A:
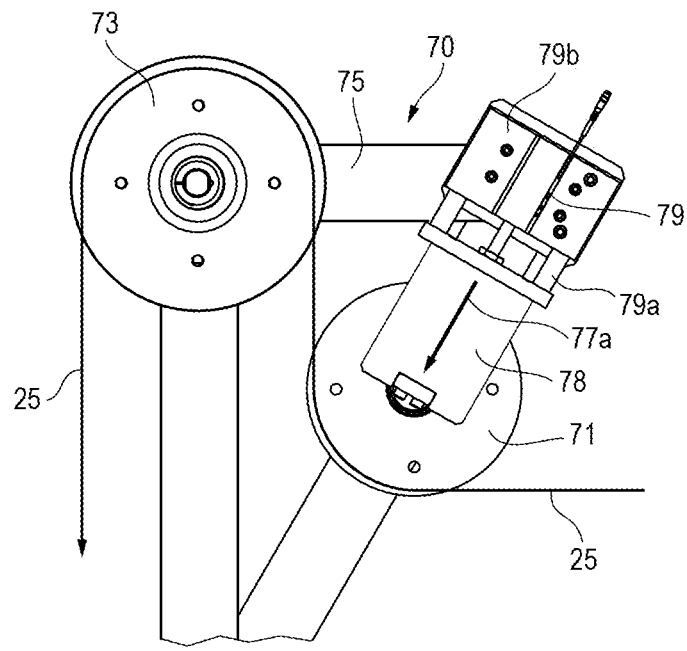
FIGS. 9A-9B are side schematic views depicting operation of the error detection module of FIGS. 8A-8B.

Referring to FIG. 9A, passage of the one or more wires 25 around the inlet sheave 71 and the outlet sheaves 73 is depicted under normal operating conditions, i.e., within acceptable wire tension parameters, such as for example around 35 lbs. During such normal conditions, the guide rods 79a and the bracket 78, together with the inlet sheave 71, are in an extended position as depicted by arrow 77a.

Figure 9B:
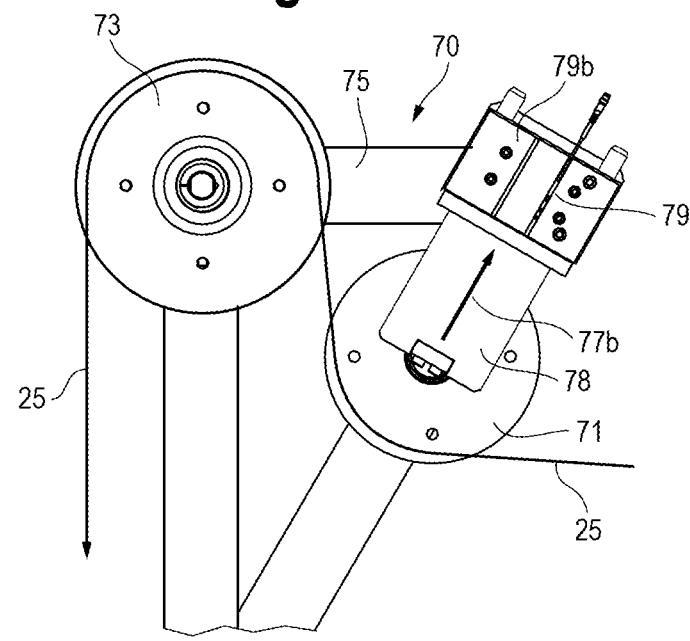

In FIG. 9B, the one or more wires 25 are depicted as experiencing an unacceptably high tension level, i.e., above a predetermined threshold, such as for example above 100 lbs. While about 1400 lbs. of tension may be a breaking strength of an exemplary wire 25, a user may determine that anything above 100 lbs, or another suitable threshold, should require detection and/or intervention to mitigate potential damage. In FIG. 9B, as the wire 25 is placed under a relatively high tension, the wire 25 may pull the inlet sheave 71 to a retracted position as depicted by arrow 77b. As the inlet sheave 71 is pulled in the retracted direction, the bracket 78 and the guide rods 79a compress towards the fixed body 79b, which in turn may be coupled to a reading device, such as a load cell. If the force sensed by the reading device is greater than the predetermined threshold, the system may be shut down.

Figure 10:
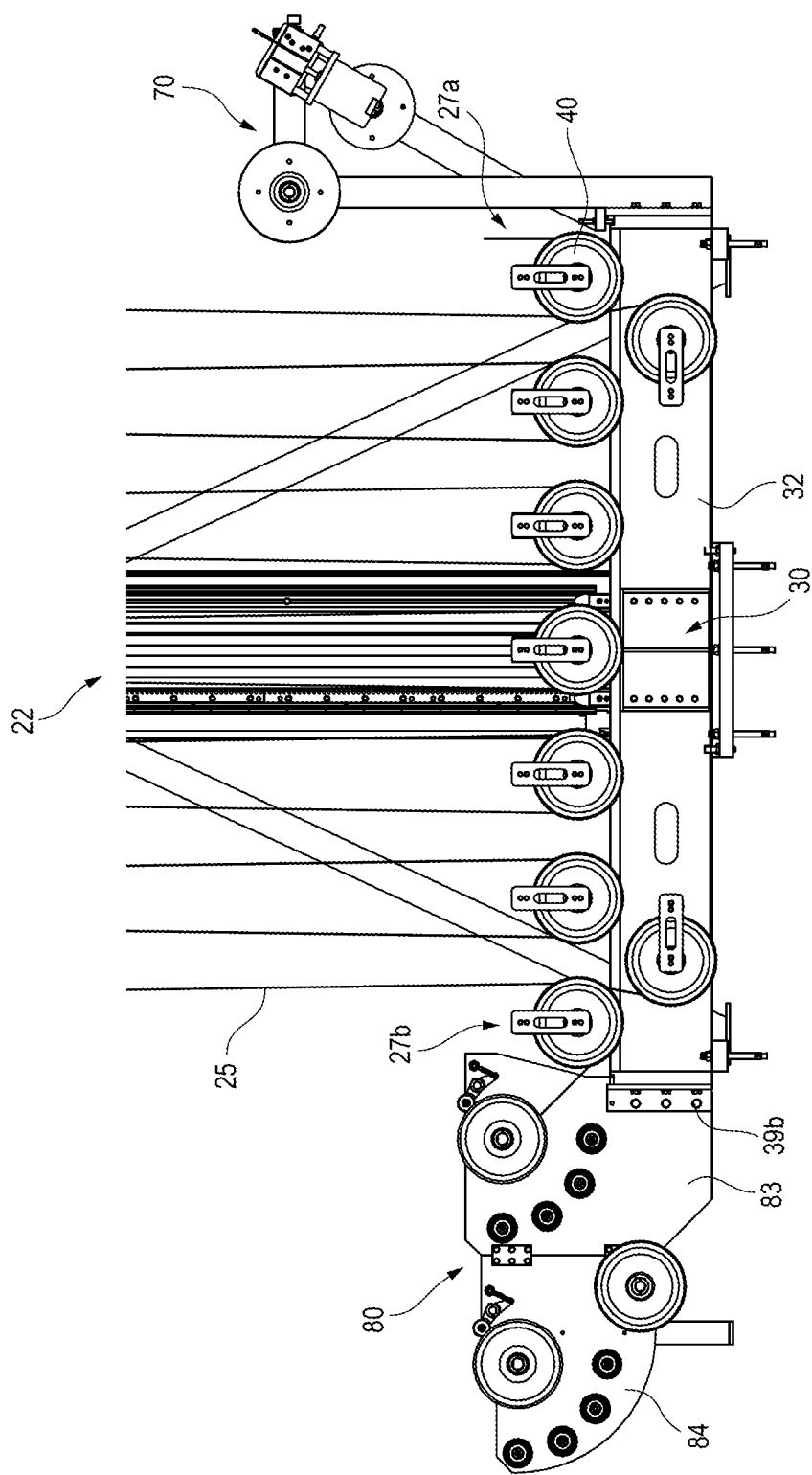
FIG. 10 is a front view of a precast module disposed at a first coupling location.

Referring to FIGS. 10-17, various embodiments of the precast assembly 80 are shown. In FIG. 10, the first module 83 is shown secured to a coupling location 39b at one end of the horizontal support member 32. For example, the first module 83 may comprise a bracket 111, shown in FIG. 11B, and bolts 112 may be secured between the bracket 111 and the coupling location 39b of the horizontal support member 32. In this manner, the first module 83 of the precast assembly 80 may be selectively removed from engagement with the festoon module 22.

Figure 11A:
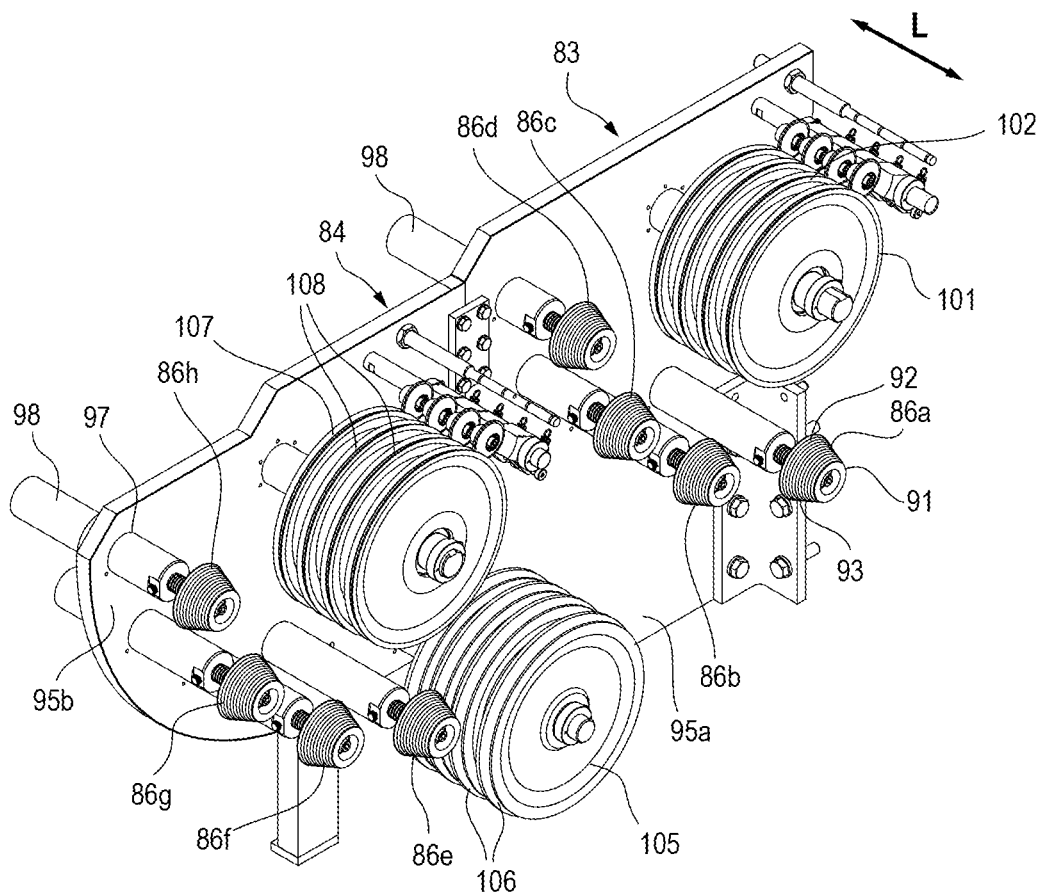
FIGS. 11A-11B are perspective and front views, respectively, illustrating features of the precast module of FIG. 10.
Figure 11B:
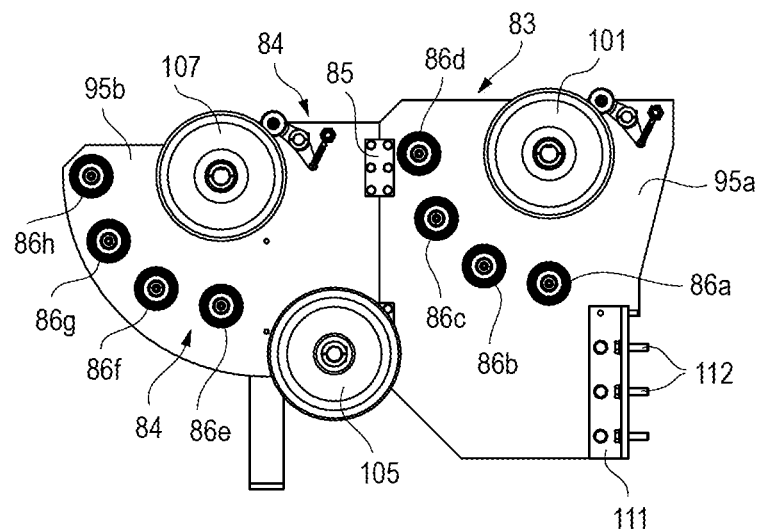
Figure 12:
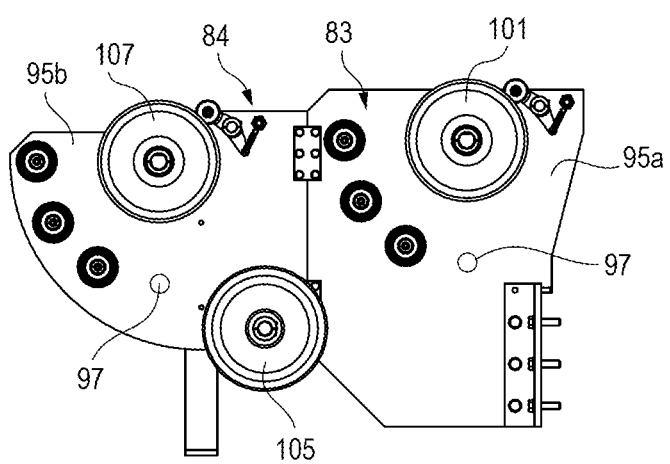
FIG. 12 is a side view of the precast module of FIGS. 10-11 with select precast pulleys omitted.

In the embodiment of FIGS. 10-12, the extension module 84 of the precast assembly 80 is also in an operative state, such that the first module 83 and the extension module 84 are secured together at one or more locations 85, as shown in FIG. 11B. Optionally, the first module 83 and the extension module 84 may be detached from one another, and only the first module 83 may be used in conjunction with the festoon system, as described in FIGS. 13-15 below.

Referring still to FIGS. 10-12, the precast assembly 80 is capable of adjusting wire paths of up to eight different wires 25, due to the provision of up to eight different precast pulleys 86a-86h. Each of the precast pulleys 86 may comprise first and second ends 91 and 92, as seen with reference to the exemplary first precast pulley 86a in FIG. 11A, and may comprise a generally tapered shape between the first and second ends 91 and 92. A plurality of grooves 93 are disposed circumferentially around the first precast pulley 86a at locations between the first and second ends 91 and 92. The groove disposed near the first end 91 comprises the smallest diameter, while the groove disposed near the second end 92 comprises the largest diameter, due to the tapered shape. A relatively small travel pathway may occur when the wire 25 is positioned around the groove of the precast pulley 86a closest to the first end 91. In contrast, a relatively long travel pathway may occur when the wire 25 is positioned to travel around the groove closest to the second end 92. Such a tapered precast pulley is described in further detail in U.S. Pat. Pub. No. 2014/0239115 ("the '115 publication"), the disclosure of which is hereby incorporated by reference in its entirety.

A support assembly 95a of the first module 83 is provided to hold the precast pulleys 86a-86d in a desired orientation, while a support assembly 95b of the extension module 84 similarly is provided to hold the precast pulleys 86e-86h in a desired orientation. In one embodiment, the support assemblies 95a and 95b comprise a plurality of bores 97 formed therein, and corresponding shafts 98 of the precast pulleys 86a-86h may be disposed through the bores 97, as depicted in FIG. 11A.

A sheave 101 having a plurality of grooves 102, in this example four grooves, may be secured to the support assembly 95a of the first module 83 to guide the wires 25 from the exit region 27b of the festoon module 22 towards the precast pulleys 86a-86d coupled to the first module 83. In other words, up to four wires are guided, via a separate groove 102 of the sheave 101, towards engagement with a particular precast pulley 86a-86d.

Sheaves 105 and 107 may be secured to the support assembly 95b of the extension module 84 to guide other wires 25 from the exit region 27b of the festoon module 22 towards the precast pulleys 86e-86h coupled to the extension module 84. In this embodiment, the sheave 105 is disposed vertically below the sheave 101 of the first module 83, as shown in FIGS. 10-12, which allows up to four additional wires 25 from the exit region 27b of the festoon module 22 to travel a pathway that bypasses vertically beneath the sheave 101 (and the entire first module 83). Thus, the additional four wires 25 may proceed directly from the exit region 27b of the festoon module 22 to the sheave 105 of the extension module 84, at which point the additional wires travel around respectively grooves 106 of the sheave 105, then around respective grooves 108 of the sheave 107, and are guided towards engagement with a particular precast pulley 86e-86h.

In one embodiment, each of the shafts 98 may be selectively advanced in a longitudinal direction L, depicted in FIG. 11A, relative to the bores 97 of the support assemblies 95a and 95b. A clamping collar may secure the position of each shaft 98 with respect to the support assemblies 95a and 95b in the longitudinal direction L. In this manner, each precast pulley 86a-86h may be aligned with a desired groove 102 or 108 of the sheaves 101 and 107, respectively. For example, as generally depicted in FIG. 11A, the shaft 98 coupled to the first precast pulley 86a extends a longer distance away from the support assembly 95a relative to the shaft 98 coupled to the fourth precast pulley 86d, and therefore the first precast pulley 86a may be aligned with a groove 102 of the sheave 101 that is further away from the support assembly 95a, compared to the groove 102 with which the fourth precast pulley 86d may be aligned.

Further, the precast pulleys 86a-86h may be individually movable in the longitudinal direction L relative to their respective shafts 98. For example, a threaded engagement may be provided at the interface between the shafts 98 and the precast pulleys 86a-86h, whereby rotation of the precast pulleys 86a-86h, while holding the shafts 98 steady, adjusts the relative position of the precast pulleys 86a-86h. Alternatively, threading may be omitted, and a clamping mechanism, plurality of detents, or the like may be used to hold the precast pulleys 86a-86h at a desired orientation relative to the shafts 98.

In one example, by adjusting the position of the first precast pulley 86a in the longitudinal direction L relative to its respective shaft 98, the first and second ends 91 and 92 may be moved closer or further from the support assembly 95a, causing a particular groove 93 in the first precast pulley 86a to align with the associated groove 102 in the sheave 101. Thus, the path of the wire 25 extending over the first precast pulley 86a is adjusted. Similar adjustments may be made individually to the shafts 98 of any of the other precast pulleys 86b through 86h, to thereby individually adjust paths of each of the wires 25, which advantageously may provide tailored tensioning and bending on a given wire 25 depending on the particular diameter of a tire bead being formed on downstream equipment. The tailored bending may help a given wire 25 transition smoothly from the precast assembly 80 towards the bead forming equipment according to its desired diameter, which may relieve tension imposed on the wire 25 at the bead forming equipment.

Referring to FIG. 12, in some examples, one or more of the precast pulleys 86a-86h may be removed. Specifically, in FIG. 12, the precast pulleys 86a and 86e have been removed from engagement with the support assemblies 95a and 95b, leaving their respective bores 97 empty. The system of FIG. 12 may be used in conjunction with a bead forming system capable of producing six tire beads. Since only six beads are being formed, then only six wires may need to be passed through the system, and therefore two of the eight precast pulleys 86 may be temporarily taken out of use. As will be appreciated, any of the eight precast pulleys 86 may be taken out of use at any given time, depending on the system requirements.

Figure 13:
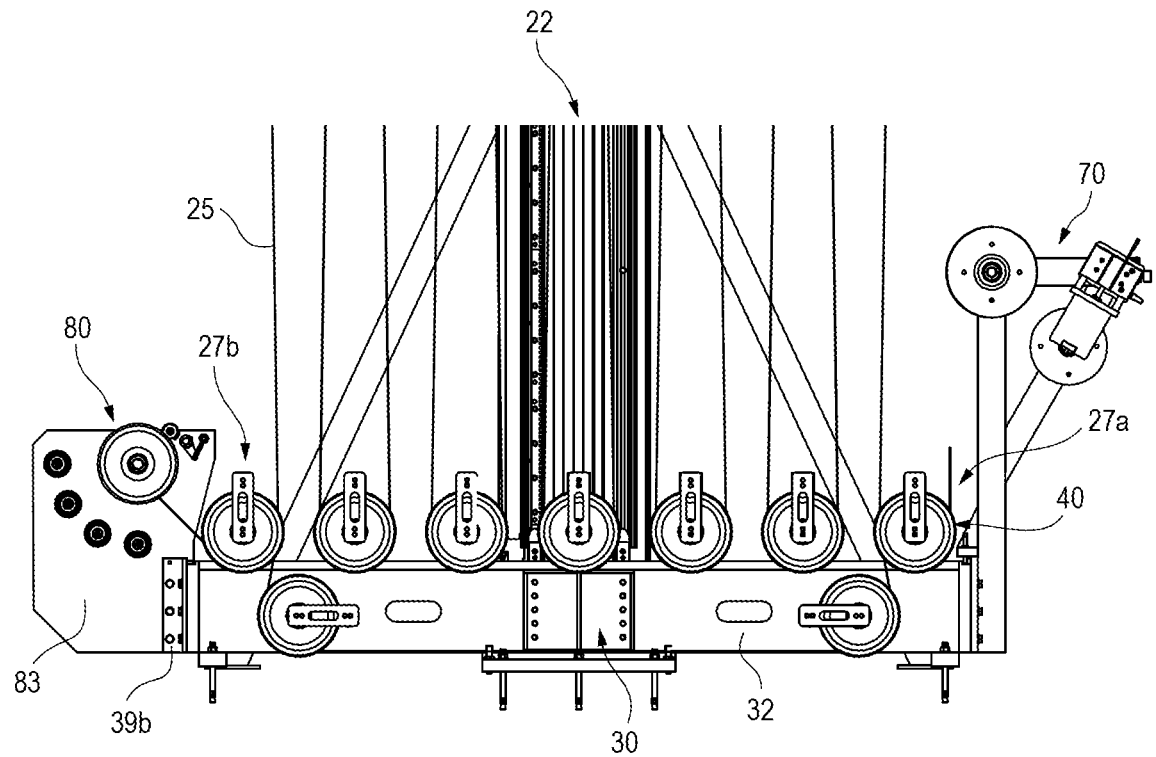
FIG. 13 is a front view of a precast module disposed at a first coupling location, with an extension module omitted.
Figure 14:
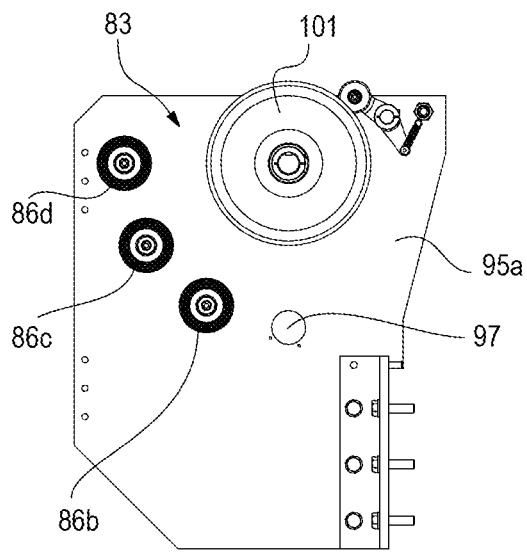
FIGS. 14-15 are front and perspective views, respectively, illustrating features of the precast module of FIG. 13.
Figure 15:
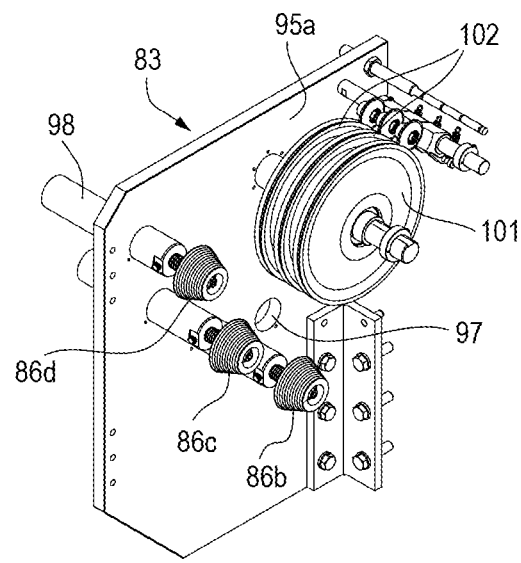

Referring to FIGS. 13-15, the modularity of the precast system 80 is such that the support assemblies 95a and 95b have been disengaged, for example, by removing bolts at locations 85. Thus, only the first module 83 is coupled to the horizontal support member 32 of the festoon module 22. The system of FIGS. 13-15 may be used in conjunction with a bead forming system capable of producing up to four tire beads via provision of precast pulleys 86a-86d, although in this example the precast pulley 86a is removed from its bore 97, leaving three precast pulleys 86b-86d engaged. Such configuration may be desirable when three beads are being formed at a downstream bead forming station, such that only three wires may need to be passed through the system.

Figure 16:
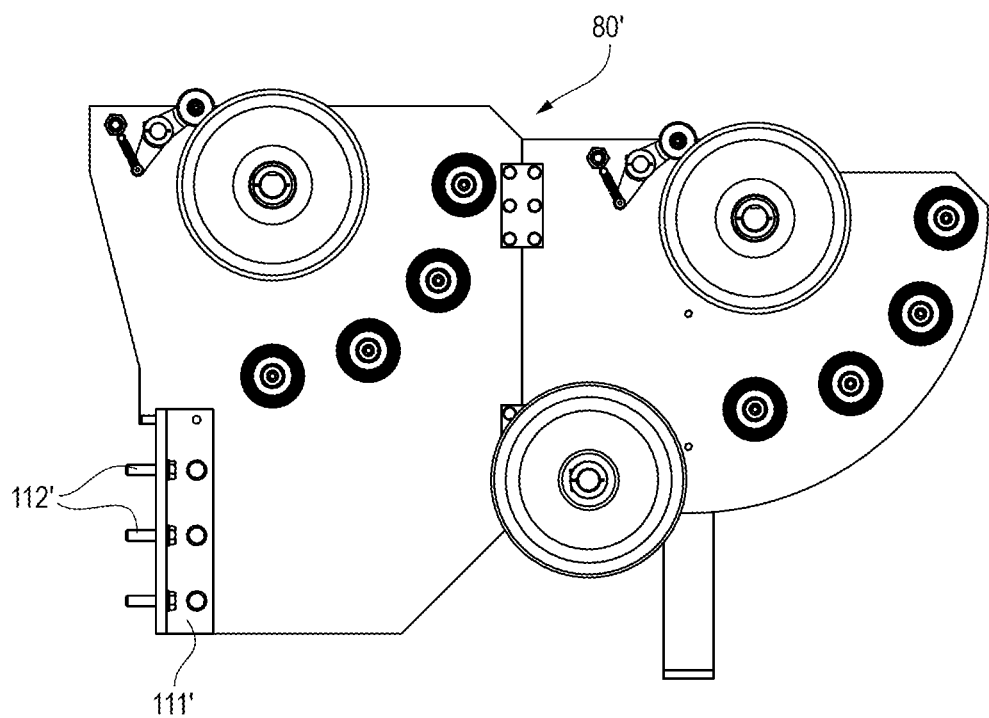
FIG. 16 is a front view of an alternative precast assembly, which may be disposed at a second coupling location.

Referring to FIG. 16, in conjunction with FIG. 3 above, in this embodiment the modularity of the festoon system 20 allows an alternative precast assembly 80' to be disposed on an opposing side of the sheaves 42 and 52 of the festoon module 22, as compared to FIGS. 1-2. The precast assembly 80' of FIG. 16 is similar to the precast assembly 80 of FIGS. 10-12, with a main exception that the parts are symmetrically opposing (or mirror-images), such that an alternative bracket 111' and bolts 112' may be secured at the coupling location 39a of the horizontal support member 32. In this embodiment, the exit region for the wires 25 is to the right in FIGS. 3 and 16, at the location that was formerly the entrance region 27a in FIGS. 1-2 and 10 above. Notably, in this example, an alternative error detection module 70' may be provided that is a mirror-image of the error detection module 70, and may be disposed at an entrance region for the wires 25 that is to the left in FIG. 3, at the location that was formerly the exit region 27b in FIGS. 1-2 and 10 above.

Advantageously, as noted above, the system therefore may be provided as a "left-handed" or "right-handed" machine, with the entrance region from the error detection module 70 or 70' being either to the left or right of the festoon module 22, and with the precast module 80 or 80' being either to the left or right of the festoon module 22. Such decisions may be tailored depending on factors such as space constraints, placement of other upstream or downstream components within a facility, or other needs of a particular user, and may advantageously avoid a user from purchasing two or more different machines.

Figure 17:
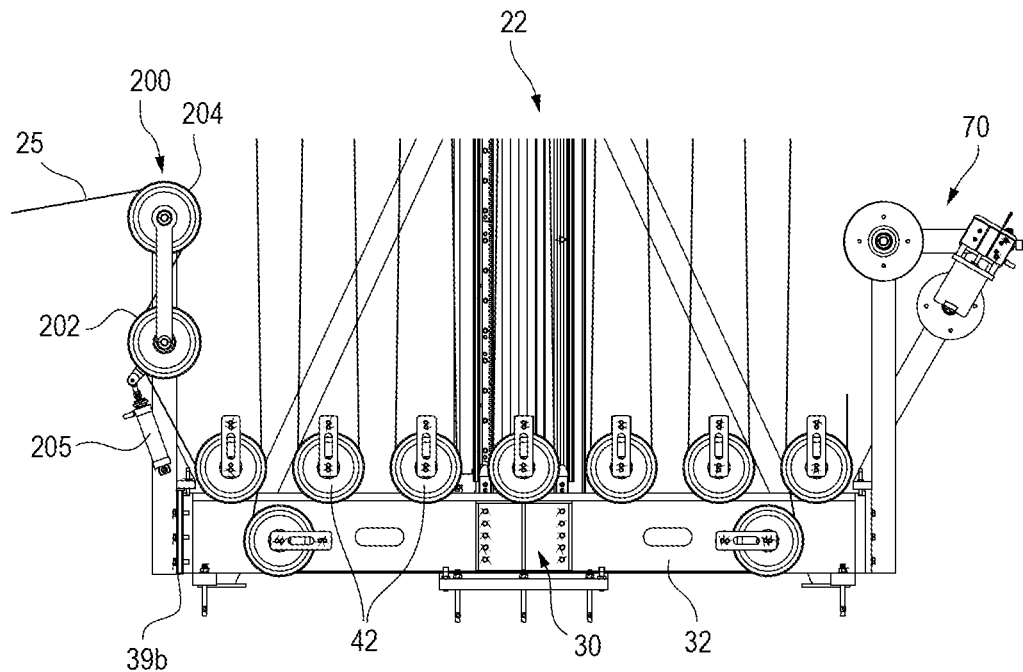
FIGS. 17-18 are, respectively, front and perspective views illustrating features of a dancer assembly.
Figure 18:
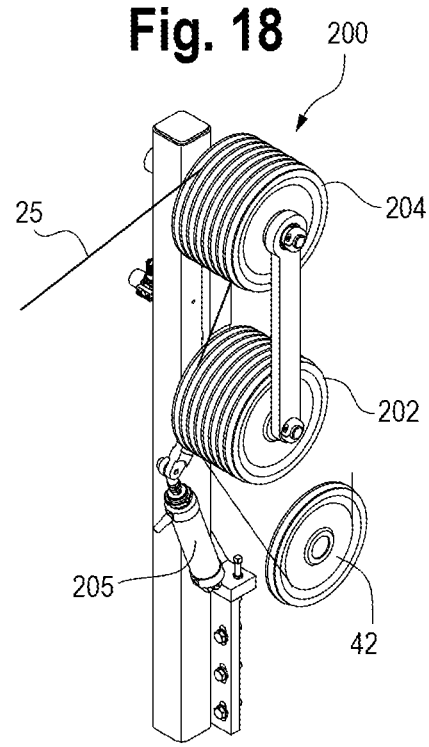

Referring to FIGS. 17-18, due to the modularity of the system, in this embodiment the dancer assembly 200 is secured to the horizontal support member 32, in lieu of the precast assembly 80 noted above, at the coupling location 39b. The dancer assembly 200 may comprise a first sheave 202, a second sheave 204, and an actuator 205. In one embodiment, the actuator 205 may comprise a pneumatic cylinder that is selectively extendable to adjust the position of the first sheave 202 relative to the second sheave 204. In this manner, the dancer assembly 200 may maintain a suitable tension on the exit side of the festoon module 22, i.e., without excessive slack. It will be appreciated that while a pneumatic cylinder is depicted for the actuator 205, in various alternatives the actuator 205 may comprise other mechanical or electric actuators capable of adjusting the relative positions of the first and second sheaves 202 and 204.

Advantageously, the user has an option of which module may be desired to be coupled to the exit region of the festoon module 22, including but not limited to the precast assembly 80 or alternatively the dancer assembly 200, due to interchangeability at the coupling locations 39b. Moreover, as with the precast assemblies 70 and 70', it will be appreciated that an alternative dancer assembly 200' may be provided that is a mirror-image of the dancer assembly 200, and which may alternatively be coupled to the location 39a of the horizontal support member 32, depending on whether a left or right handed system is desirable.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

I claim:
1. A festoon system, comprising:
 a festoon module comprising a support assembly, and further comprising at least one upper sheave and at least one lower sheave, which are movable relative to one another by movement of at least one of the upper sheave or the lower sheave,
 wherein at least one wire is configured to enter the festoon module at an entrance region, extend around a groove of the least one lower sheave and at least one groove of the at least one upper sheave, and then exit the festoon module at an exit region;
 a first coupling location of the support assembly adjacent to the entrance region of the festoon module;
 a second coupling location of the support assembly adjacent to the exit region of the festoon module; and
 at least two modules selected from the group comprising an error detection module, a precast assembly, and a dancer assembly,
 wherein a first module selected among the error detection module, the precast assembly, and the dancer assembly is coupled to the second coupling location in a first operative state, and
 wherein a second, different module selected among the error detection module, the precast assembly, and the dancer assembly is coupled to the second coupling location in a second operative state.

2. The system of claim 1, wherein the first module is a precast assembly, wherein the precast assembly comprises a first module of the precast assembly and an extension module of the precast assembly, wherein the first module of the precast assembly is coupled to the second coupling location of the support assembly, and wherein the extension module of the precast assembly is coupled to the first module of the precast assembly.

3. The system of claim 1, wherein the error detection module comprises an inlet sheave that is axially movable when a tension exceeding a predetermined threshold is placed on the at least one wire.

4. The system of claim 3, wherein the error detection module comprises a pneumatic cylinder, wherein the inlet sheave is axially movable to compress guide rods coupled to the pneumatic cylinder when the tension exceeding the predetermined threshold arises.

5. The system of claim 4, further comprising a C-shaped bracket disposed between the inlet sheave and the guide rods coupled to the pneumatic cylinder.

6. The system of claim 1, wherein, in the second operative state, at least one wire enters the festoon module at the exit region, extends around a groove of the at least one lower sheave and at least one groove of the at least one upper sheave, and then exits the festoon module at the entrance region.

7. A festoon system, comprising:
   a festoon module comprising a support assembly, and further comprising at least one upper sheave and at least one lower sheave, which are movable relative to one another by movement of at least one of the upper sheave or the lower sheave,
   wherein at least one wire is configured to enter the festoon module at an entrance region, extend around a groove of the at least one lower sheave and at least one groove of the at least one upper sheave, and then exit the festoon module at an exit region;
   a first coupling location of the support assembly adjacent to the entrance region of the festoon module; and
   an error detection module configured to be coupled to the first coupling location,
   wherein the error detection module comprises an inlet sheave that is axially movable when a tension exceeding a predetermined threshold is placed on the at least one wire,
   wherein the error detection module comprises a pneumatic cylinder, wherein the inlet sheave is axially movable to compress guide rods coupled to the pneumatic cylinder when the tension exceeding the predetermined threshold arises.

8. The system of claim 7, further comprising a C-shaped bracket disposed between the inlet sheave and the guide rods coupled to the pneumatic cylinder.

9. A festoon system, comprising:
   a festoon module comprising a support assembly, and further comprising at least one upper sheave and at least one lower sheave, which are movable relative to one another by movement of at least one of the at least one upper sheave or the at least one lower sheave,
   wherein at least one wire is configured to enter the festoon module at an entrance region, extend around a groove of the at least one lower sheave and at least one groove of the at least one upper sheave, and then exit the festoon module at an exit region;
   a first coupling location of the support assembly adjacent to the entrance region of the festoon module;
   a second coupling location of the support assembly adjacent to the exit region of the festoon module; and
   a precast assembly comprising a first module and an extension module, wherein the first module of the precast assembly is coupled to the second coupling location of the support assembly, and wherein the extension module is coupled to the first module of the precast assembly.

10. A festoon system, comprising:
    a festoon module comprising a support assembly, and further comprising at least one upper sheave and at least one lower sheave, which are movable relative to one another by movement of at least one of the at least one upper sheave or the at least one lower sheave,
    wherein at least one wire is configured to enter the festoon module at an entrance region, extend around a groove of the at least one lower sheave and at least one groove of the at least one upper sheave, and then exit the festoon module at an exit region;
    a first coupling location of the support assembly adjacent to the entrance region of the festoon module;
    a second coupling location of the support assembly adjacent to the exit region of the festoon module; and
    an error detection module coupled to the first coupling location in a first operative state,
    wherein one of the error detection module or a modified error detection module is coupled to the second coupling location in a second operative state.

11. The system of claim 10, wherein the modified error detection module is a symmetrically-opposing version of the error detection module.

12. A festoon system, comprising:
    a festoon module comprising a support assembly, and further comprising at least one upper sheave and at least one lower sheave, which are movable relative to one another by movement of at least one of the at least one upper sheave or the at least one lower sheave,
    wherein at least one wire is configured to enter the festoon module at an entrance region, extend around a groove of the at least one lower sheave and at least one groove of the at least one upper sheave, and then exit the festoon module at an exit region;
    a first coupling location of the support assembly adjacent to the entrance region of the festoon module;
    a second coupling location of the support assembly adjacent to the exit region of the festoon module; and
    a precast assembly coupled to the second coupling location in a first operative state,
    wherein one of the precast assembly or a modified precast assembly is coupled to the first coupling location in a second operative state.

13. The system of claim 12, wherein the modified precast assembly is a symmetrically-opposing version of the precast assembly.

14. The system of claim 12, wherein the precast assembly comprises a first module and an extension module, wherein the first module is coupled to the second coupling location of the support assembly in the first operative state, and wherein the extension module is coupled to the first module.

* * * * *